United States Patent [19]

Koketsu

[11] Patent Number: 5,950,952
[45] Date of Patent: Sep. 14, 1999

[54] ACCELERATION SENSOR APPARATUS FOR A VEHICLE

[75] Inventor: Eiji Koketsu, Aichi-Ken, Japan

[73] Assignee: Kabushiki Kaisha Tokai-Rika-Denki-Seisakusho, Aichi-Ken, Japan

[21] Appl. No.: 08/788,463

[22] Filed: Jan. 29, 1997

[30] Foreign Application Priority Data

Feb. 2, 1996 [JP] Japan .................................. 8-017871
Feb. 2, 1996 [JP] Japan .................................. 8-017872

[51] Int. Cl.$^6$ ........................... B60R 22/40; B60R 21/00; B60R 22/36; G01P 15/00
[52] U.S. Cl. .................................... 242/384.4; 242/384.6; 280/806; 297/478; 73/514.01
[58] Field of Search ............................ 242/384.4, 384.5, 242/384.6; 280/806, 807; 297/478, 480; 73/514.36, 514.01

[56] References Cited

U.S. PATENT DOCUMENTS

| | | |
|---|---|---|
| 4,164,337 | 8/1979 | Blom . |
| 4,228,969 | 10/1980 | Svensson . |
| 4,238,087 | 12/1980 | Makishima . |
| 4,467,981 | 8/1984 | Mori et al. .......................... 242/384.4 |
| 5,289,986 | 3/1994 | Hoshihara ........................... 242/107.4 |

FOREIGN PATENT DOCUMENTS

| | | |
|---|---|---|
| 0351551 | 6/1989 | European Pat. Off. . |
| 2523675 | 3/1977 | Germany . |
| 3912027 | 10/1989 | Germany . |
| 4022571 | 2/1991 | Germany . |
| 4109179 | 9/1991 | Germany . |
| 1515126 | 5/1975 | United Kingdom . |
| 1525523 | 6/1976 | United Kingdom . |
| 2235124 | 2/1991 | United Kingdom . |
| 0 084 955 | 8/1983 | WIPO . |
| 9603295 | 2/1996 | WIPO . |

OTHER PUBLICATIONS

UK Search Report.
British Search Report.

Primary Examiner—John Q. Nguyen
Attorney, Agent, or Firm—Sixbey Friedman Leedom & Ferguson; Thomas W. Cole

[57] ABSTRACT

An acceleration sensor apparatus for a vehicle capable of properly detecting an acceleration acting on a vehicle body in a predetermined direction even when the mounted orientation of the acceleration sensor apparatus changes relative to the vehicle body, and capable of providing an output operation when the vehicle body tilts more than a predetermined angle. A sensor housing is fixed on a vehicle body such as on a seatback. A sensor bracket is swingably supported by the sensor housing about an axis parallel to an axis of tilt of the seatback. An inertial body is movably supported in a support depression of the sensor bracket. An output interlock member provides an output operation in an interlocking relation with an ascending movement of the inertial body along a slope of the support depression. An upper weight is located above a swing center axis. A lower weight is provided so that the center of gravity of an assembly swingably supported about the swing center axis is positioned below the swing center axis. Further, when the sensor bracket swings more than a predetermined angle, a forcibly driving member provides an output operation so as to restrain the webbing from further being released from a retractor.

18 Claims, 8 Drawing Sheets

F I G. 2
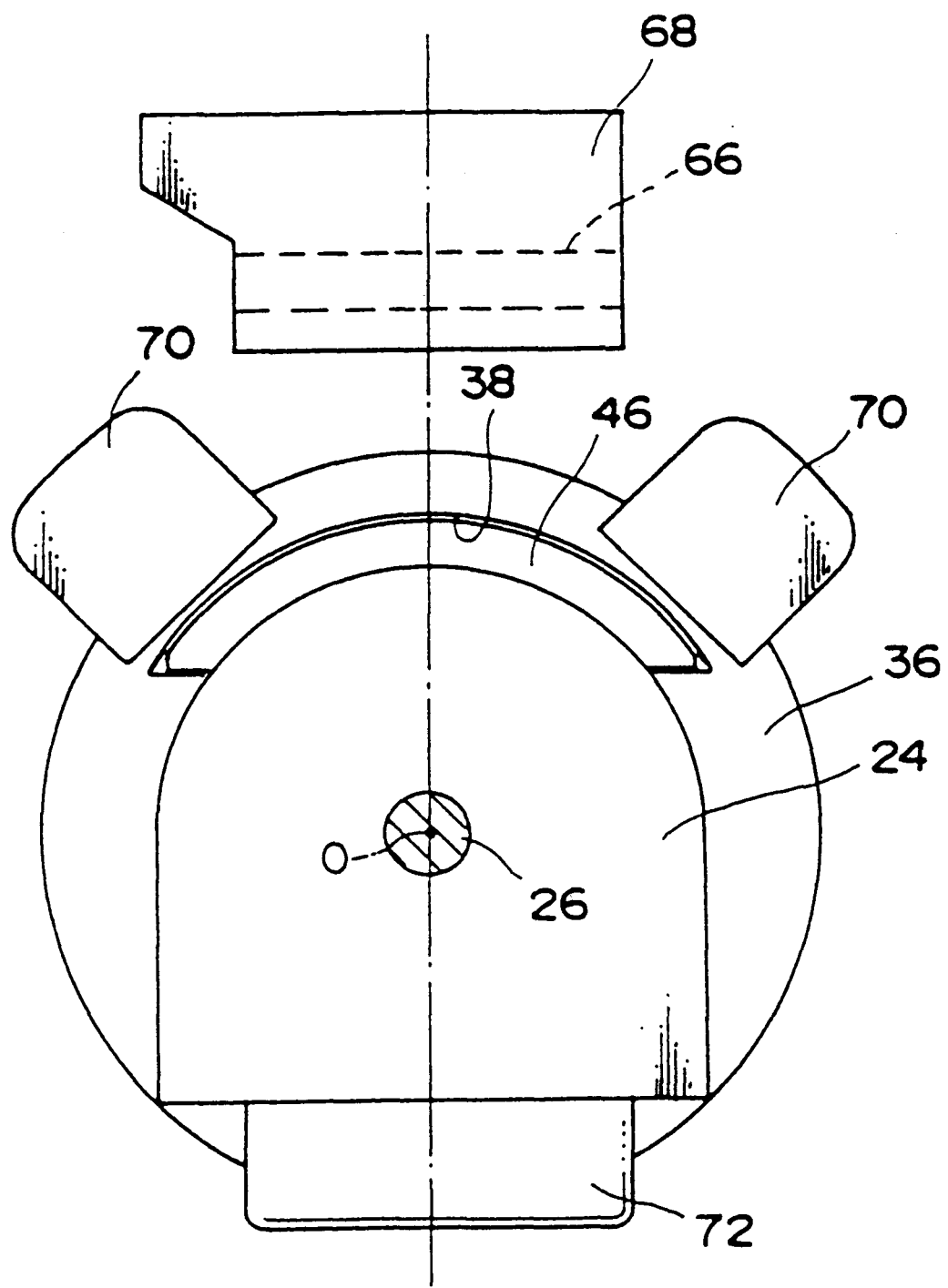

ACCELERATION SENSOR APPARATUS FOR A VEHICLE

BACKGROUND OF THE INVENTION

1. Field of the Invention

The present invention relates to an acceleration sensor apparatus for a vehicle which is used with an air bag, a retractor for a seat belt apparatus and the like, provided in the vehicle.

2. Description of the Prior Art

Generally, a vehicle is provided with a variety of measures against an unusually large acceleration imposed thereon. Examples of such measures include deployment of an air bag, and the locking of a retractor of a seat belt apparatus to prevent a webbing from further being released from the retractor. Thus, air bag and retractor apparatuses have an acceleration sensor apparatus to detect accelerations acting on a vehicle that are greater than a predetermined value.

In various apparatuses each having an acceleration sensor apparatus, the acceleration sensor apparatus is mounted at a predetermined angle in relation to a vehicle body. For example, in a seat belt retractor, the acceleration sensor apparatus is mounted on a center pillar of the vehicle body or on a seat cushion at a predetermined angle of installation. Also, in an air bag apparatus, the acceleration sensor apparatus is mounted in a steering panel or an instrument panel at a predetermined angle of installation.

As described above, a conventional acceleration sensor apparatus is mounted at a predetermined angle in relation to a vehicle body. When an acceleration sensor for detecting an acceleration in a predetermined direction is mounted in a movable portion of a vehicle, for example, in a retractor mounted to a seatback of a reclining seat, the angle of the acceleration sensor may vary in some cases. That is, when an occupant tilts the seatback to adjust his/her sitting posture, the orientation of the acceleration sensor apparatus of the retractor alters, resulting in a failure to detect an acceleration in a predetermined direction. As a result, an acceleration in a wrong direction will be detected.

Further, a retractor may be required to be locked to thereby prevent a webbing from further being released from the retractor when the vehicle body is tilted more than a predetermined angle.

SUMMARY OF THE INVENTION

In view of the foregoing fact, it is an object of the present invention to provide an acceleration sensor apparatus for a vehicle capable of properly detecting an acceleration acting on a vehicle body even when the mounted orientation of the sensor apparatus changes, and capable of providing an output operation when the vehicle body tilts more than a predetermined angle.

The present invention provides an acceleration sensor apparatus for a vehicle wherein an inertial body is inertially moved according to a vehicle acceleration, comprising: a sensor bracket which supports the inertial body and is swingably supported in a vehicle; a lower weight which is mounted on the sensor bracket, has a center of gravity located below a swing center of the sensor bracket, and is adapted to maintain the sensor bracket at a present position regardless of a tilt of the vehicle; and an upper weight which is lighter than the lower weight, is mounted on the sensor bracket, and has a center of gravity located above the swing center of the sensor bracket.

As a result of the above-described structure being employed, even when a part of the vehicle on which the sensor bracket is mounted is tilted, the lower weight is adapted to maintain the sensor bracket at its original position, so that the sensor bracket detects an acceleration in a fixed direction. Also, even when a great acceleration acts on the acceleration sensor apparatus, inertial forces acting on the upper and lower weights function to maintain the sensor bracket at its original position. Thus, the acceleration sensor apparatus can always detect an acceleration in a predetermined direction relative to a vehicle body.

Preferably, an accommodation section for accommodating at least the upper or lower weight is formed in the sensor bracket.

The above-described structure facilitates the work of mounting the upper or lower weight onto the sensor bracket to thereby provide an inexpensive product.

Further, the present invention provides an acceleration sensor apparatus for a vehicle comprising: a sensor housing fixed on a seatback of a reclining seat of a vehicle; a sensor bracket supported swingably about an axis which is substantially parallel to an axis of tilting the seatback, the sensor bracket being swingable relative to the sensor housing; an inertial body having a spherical shape and supported so as to be movable within a predetermined range in a support depression formed in the sensor bracket; an output member for locking a seat belt retractor gear in an interlocking relation with the inertial body's ascending movement along a slope of the support depression upon reception of an acceleration acting on a vehicle; an upper weight located above a swing center axis of the sensor bracket and adapted to cancel a swing of the sensor bracket induced by an acceleration acting on the sensor bracket to thereby bring the sensor bracket to a standstill; and a lower weight for bringing a center of gravity of an entire body supported swingably about the swing center axis of the sensor bracket to a position lower than the swing center axis.

As a result of the above-described structure being employed, even when an occupant tilts a seatback of a reclining seat, the center-of-gravity setting means causes the sensor bracket to swing relative to the sensor housing fixed on the seatback to thereby maintain the sensor bracket at its original position. Also, when a great acceleration acts on the acceleration sensor apparatus, an inertial force acting on the upper weight located above the swing center axis causes the sensor bracket to be maintained at its original position, and thus only the inertial body moves along the surface of the support depression. This movement of the inertial body is output from the acceleration sensor apparatus by means of the output member. In this manner, an acceleration can be properly detected by the acceleration sensor apparatus.

Preferably, there is provided a forcibly driving member that drives the output member when a tilt of a vehicle reaches a predetermined value. As a result of this structure being employed, when an entire vehicle body tilts more than a predetermined angle, the forcibly driving member drives the output member to thereby lock a retractor, and thus webbing is restrained from further being released.

Preferably, the forcibly driving member is a projection which integrally projects from the sensor bracket. As a result of this structure being employed, when a vehicle body tilts more than a predetermined angle, the sensor bracket relatively swings more than a predetermined angle. Consequently, the integral projection from the sensor bracket drives the output member to thereby lock the retractor as described above.

BRIEF DESCRIPTION OF THE DRAWINGS

FIG. 2 is a side view taken along line II—II of FIG. 1, showing a state that a sensor bracket is in its original position;

DETAILED DESCRIPTION OF THE PREFERRED EMBODIMENTS

Figure 1:
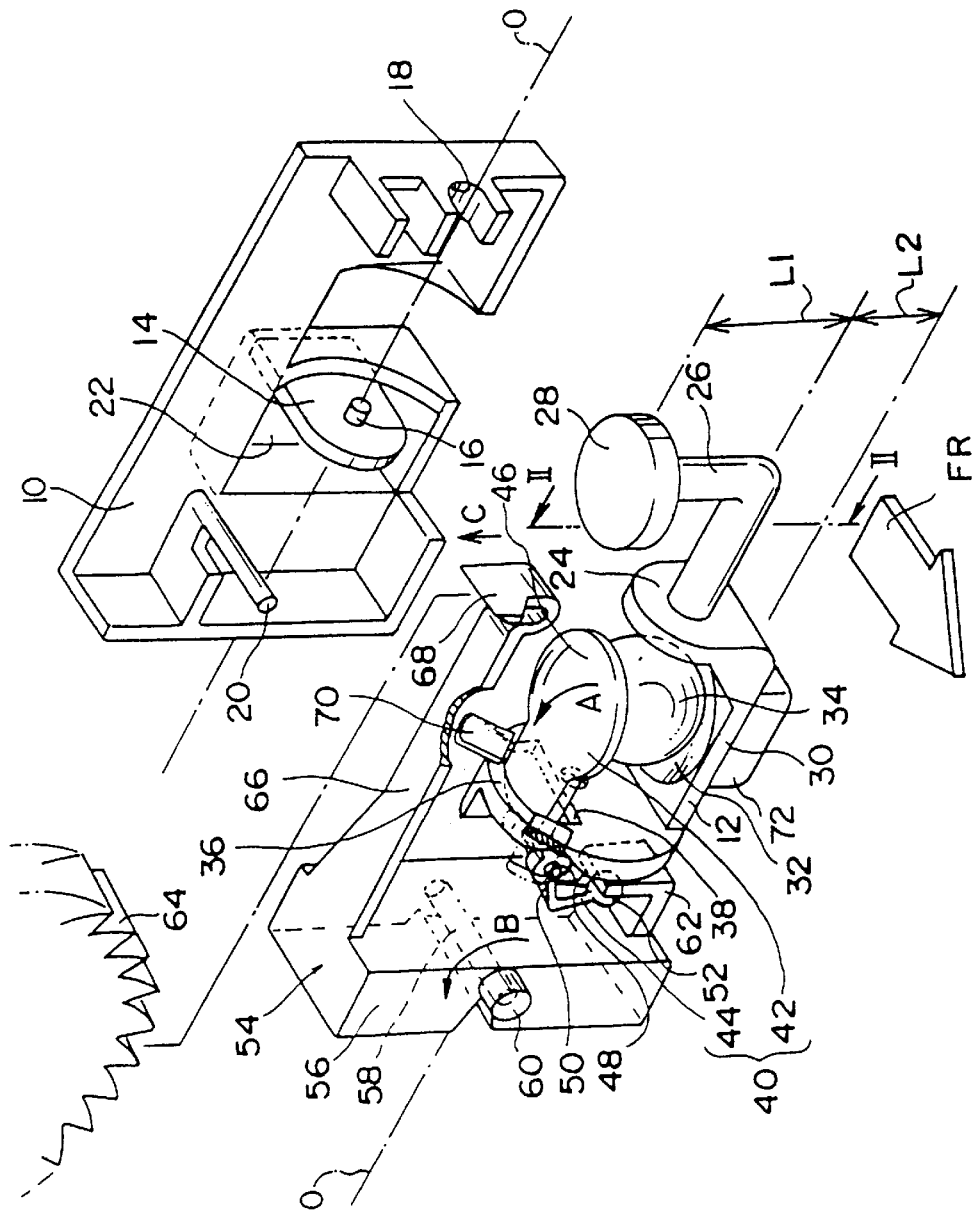
FIG. 1 is an exploded perspective view of an acceleration sensor apparatus for a vehicle according to a first embodiment of the present invention.

FIG. 1 shows an acceleration sensor apparatus for a vehicle according to a first embodiment of the present invention which is employed as an acceleration sensor for use with a retractor for a seat belt apparatus.

Figure 12:
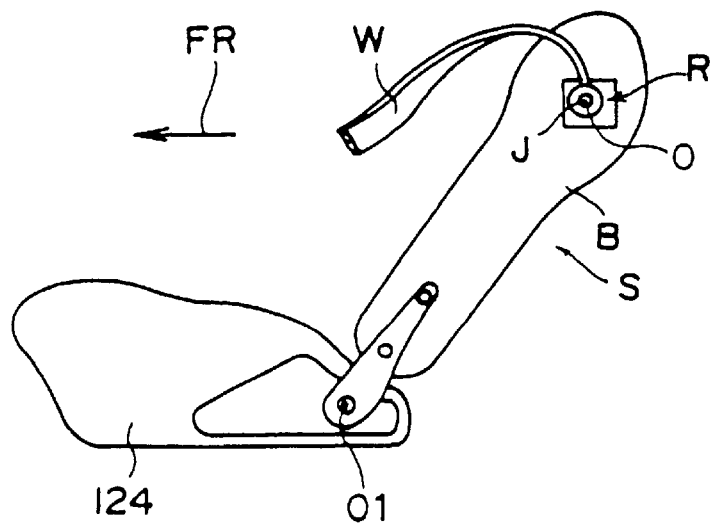
FIG. 12 is a schematic side view of a reclining seat whose seatback is provided with the acceleration sensor apparatus of the present invention.

As shown in FIG. 12, a retractor R used in this seat belt apparatus is located at an upper portion of a seatback B of a reclining seat S within a vehicle, and is provided with a sensor housing 10 fixed therein. As shown in FIG. 1, the sensor housing 10 includes a sensor bracket 12 and a support and pivot structure for attaching an output member of an output mechanism thereto.

As shown in FIG. 1, a support plate 14 projects from the sensor housing 10 at a middle portion within the interior thereof. A small cylindrical axial pin 16 stands on the planar surface of the support plate 14 at the central portion thereof. The axial pin 16 forms a part of a swing center axis 0 that pivotably supports the sensor bracket 12. A bearing concave 18 is formed at one end of the sensor housing 10 so as to be positioned on the swing center axis 0. As shown in FIG. 12, the swing center axis 0 is in parallel with a swing center axis 01 which extends through a seat base member 124 and about which seatback B swings.

A shaft 20 for pivotably supporting the output member is integrally provided at the other end of the sensor housing 10. Further, a clearance recess 22 for housing a part of the output mechanism is formed in the sensor housing 10 between the support plate 14 and the shaft 20.

As shown in FIG. 1, in the sensor bracket 12 housed in the sensor housing 10 having the above-described structure, free-ended side portions 24 and 36 stand in parallel with each other at both ends of a bottom plate portion 30, respectively forming a generally U-shape as viewed from the side. An arm 26 projects from the outer surface of the free-ended side portion 24 and extends along the swing center axis 0, wherein it is bent upward at a right angle from the middle portion thereof, thus forming a hook-like shape. An upper weight 28 is integrally attached to the free end portion of the arm 26.

The upper weight 28 having a predetermined weight is made of metal or other materials and is integrally attached to the arm 26.

In the sensor bracket 12, a conical support depression 32 is formed in the top surface of the bottom plate portion 30, i.e. the planar surface of the bottom plate portion 30 located on the side facing the swing center axis 0, such that the center of the support depression 32 coincides with the center of the top surface. The support depression 32 has a V-shaped vertical section having a predetermined angle of slope. An inertial body 34 having a predetermined height is movably placed in the support depression 32. The inertial body 34 is spherical, and is made of metal. Accordingly, upon being subjected to a predetermined horizontal acceleration, the inertial body 34 ascends along the slope of the support depression 32.

Figure 8:
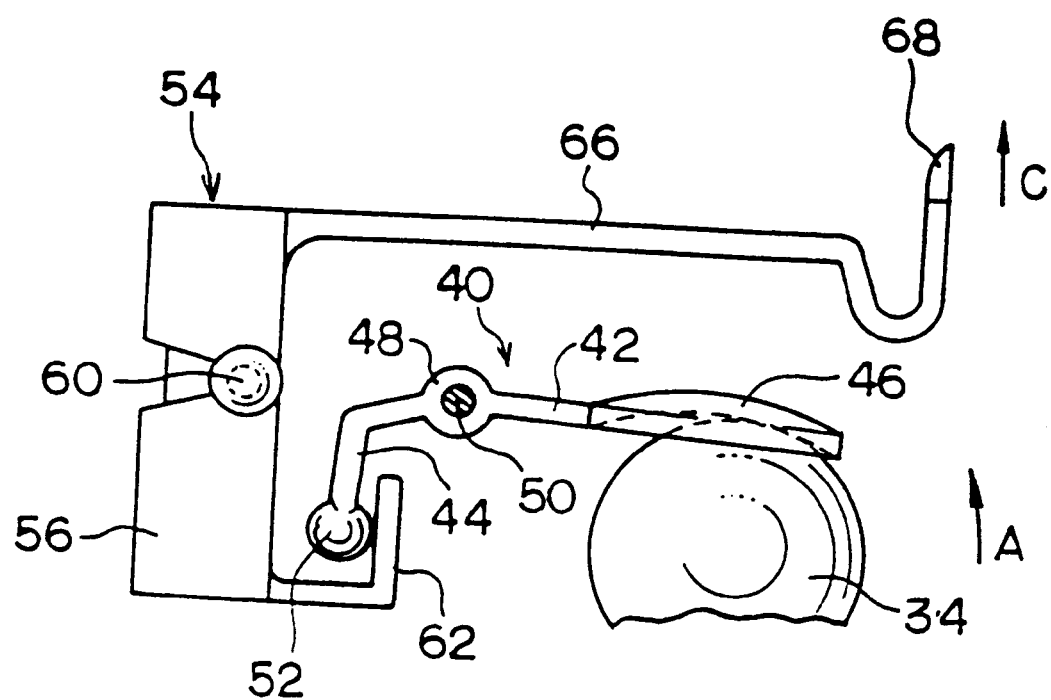
FIG. 8 is a side view showing an output interlock member and an interlock stopper member of the acceleration sensor apparatus according to the first embodiment.

In the sensor bracket 12, a semicircular opening 38 is cut through the end of the free-ended side portion 36. An output interlock member 40 is disposed such that it passes through the opening 38. As shown in FIG. 8, the output interlock member 40 is composed of a driven portion 42 and a connection portion 44 that are integrated to form a bent shape. The driven portion 42 has a circular end section 46 that is integrally formed at the tip end of a rectangular plate portion thereof. A spherical concave is formed in the planar surface of the circular end section 46 on the side that faces the bottom plate portion 30. The inertial body 34 is held between the spherical concave formed in the circular end section 46 and the support depression 32 formed in the bottom plate portion 30.

A bearing bore portion 48 is formed at an intermediate portion of the output interlock member 40, i.e. at the base portion of both the driven portion 42 and the connection portion 44. An axial pin 50 inserted into the bearing bore portion 48 is pivotably inserted into a bearing bore portion formed in the free-ended side portion 36 of the sensor bracket 12. Thus, the output interlock member 40 is pivotably mounted on the free-ended side portion 36.

In the above-described structure, the driven portion 42 extends from its base portion supported by the axial pin 50, and protrudes over the bottom plate portion 30 through the opening 38. Accordingly, the opening 38 limits a swinging movement of the driven portion 42 about the axial pin 50. Thus, when the inertial body 34 held between the spherical concave formed in the driven portion 42 and the support depression 32 ascends along the slope of the support depression 32 to a predetermined height, the driven portion 42 is prevented from swinging any further about the axial pin 50. That is, the driven portion 42 prevents the inertial body 34 from further ascending along the slope of the support depression 32. Hence, the inertial body 34 is maintained between the support depression 32 and the spherical concave formed in the circular end section 46 of the driven portion 42.

As described above, as the inertial body 34 ascends along the slope of the support depression 32, the driven portion 42 swings in the direction of arrow A shown in FIG. 1. This causes the connection portion 44 to also swing in the direction of arrow A. As shown in FIGS. 1 and 8, the connection portion 44 extends from the bearing bore portion 48 of the output interlock member 40 and is bent into the shape of a letter L as viewed from the side. A spherical interlock head 52 is integrally formed at the free end of the connection portion 44. An interlock stopper member 54, which is a part of the output mechanism, is engaged in an interlocking manner with the interlock head 52.

The interlock stopper member 54 is shaped like a hook. A cylindrical bearing bore 58 is formed in a shaft support portion 56 having a rectangular cross-section, at an intermediate portion thereof. One end of the bearing bore 58 is blocked with a small cylindrical cover 60.

The bearing bore 58 opens at a side wall of the shaft support portion 56. The shaft 20 of the sensor housing 10 is inserted into the bearing bore 58 so as to pivotably support the interlock stopper member 54. An interlock projection 62 having an L-shaped cross-section integrally projects from one end section of the shaft support portion 56 of the interlock stopper member 54, whose end section corresponds to the interlock head 52 of the output interlock member 40. The interlock head 52 of the connection portion 44 is held between the shaft support portion 56 and the interlock projection 62.

In the interlock stopper member 54, a stopper member 66 integrally projects from the other end section of the shaft support portion 56, whose end section is located on the side closer to a retractor gear 64. The free end portion of the stopper member 66 is formed into a U shape as viewed from the side and extends toward the retractor gear 64. An acute latch tooth 68 is integrally formed at the free end portion of the stopper member 66.

As the interlock stopper member 54 pivots on the shaft 20 in the direction of arrow B, the latch tooth 68 of the stopper member 66 moves in the direction of arrow C. As a result, the latch tooth 68 engages with a tooth space of the retractor gear 64 to thereby lock the retractor gear 64. This causes the inertia lock mechanism of the retractor R to operate (description of the inertia lock mechanism is omitted because it is publicly known). Consequently, a reel-up shaft for reeling up a seat belt webbing W stops rotating to thereby restrain the webbing W from further being released.

Figure 3:
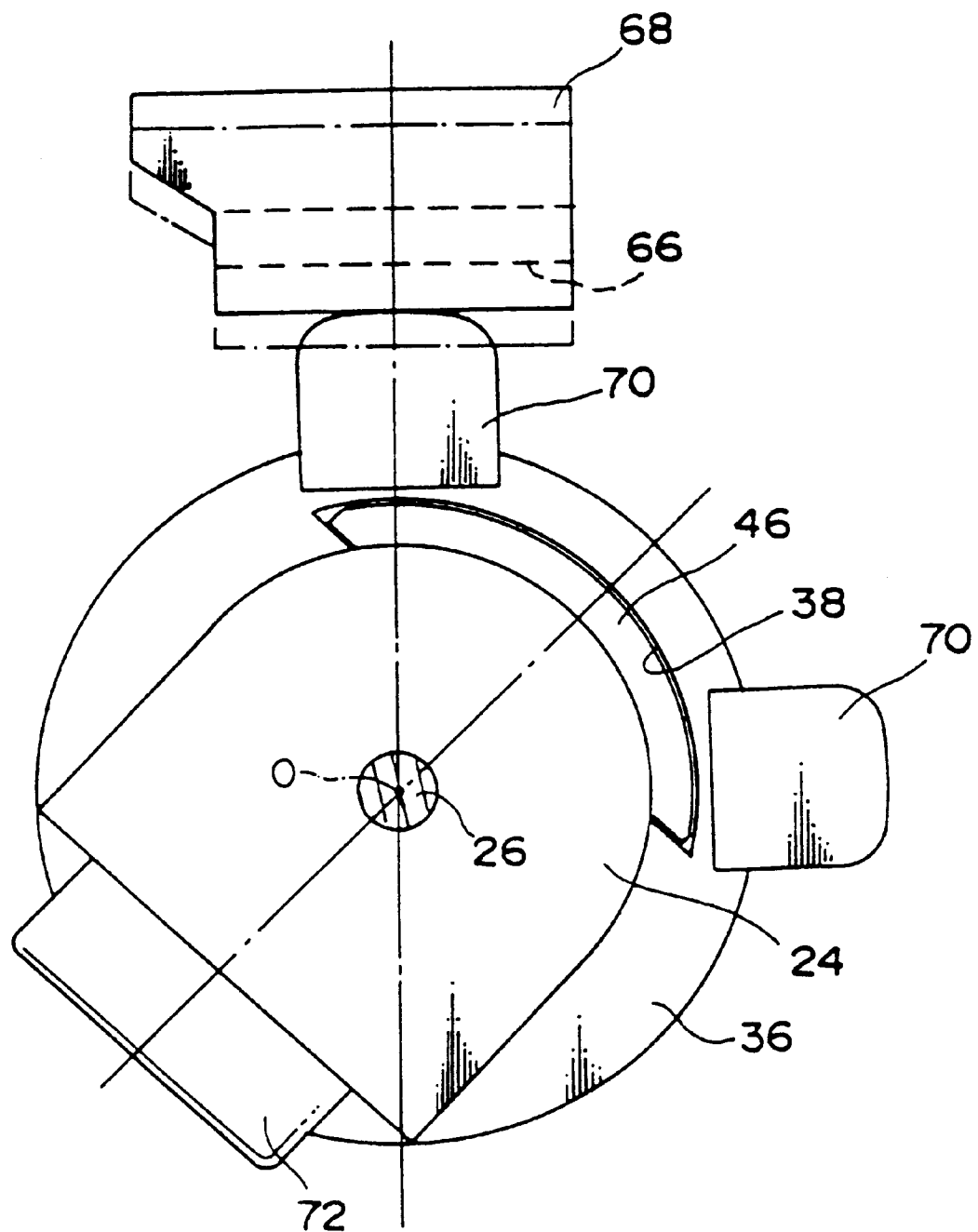
FIG. 3 is a side view taken along line II—II of FIG. 1, showing a state that the sensor bracket is tilted from its original position.

As shown in FIGS. 2 and 3, in the sensor bracket 12, forcibly driving members 70 are provided on the free-ended side portion 36 in the vicinity of both lateral ends of the opening 38 in such a manner as to project in radial directions from the swing center axis 0. Each of the forcibly driving members 70 is a small rectangular projection having a rounded tip end portion. The forcibly driving members 70 are arranged so as to function in the following manner. When the sensor bracket 12 rotates about the swing center axis 0 by a predetermined angle, the tip end portion of one of the forcibly driving members 70 abuts the bottom surface of the stopper member 66 at a central portion thereof, thus pushing up the stopper member 66, as shown in FIG. 3. This causes the interlock stopper member 54 to pivot about the shaft 20 in the direction of arrow B. As a result, the latch tooth 68 formed at the free end portion of the stopper member 66 engages with a tooth space of the retractor gear 64.

In the sensor bracket 12 swingably supported about the swing center axis 0, the output interlock member 40, which is part of the output mechanism, the upper weight 28 provided on the arm 26, the forcibly driving members 70, and the inertial body 34 are arranged as described above. In order to maintain these members at their original positions shown in FIG. 1 with respect to the swing center axis 0 regardless of a tilt of the seatback B, a lower weight 72 is provided on the bottom plate portion 30 at the side opposite the support depression 32. The lower weight 72 functions as a center-of-gravity setting means.

As a result of provision of the lower weight 72, the center of gravity of the sensor bracket 12 and its attachments is positioned below the swing center axis 0 toward the bottom plate portion 30. Thus, a vertical axis V of the support depression 32 is maintained in the vertical direction to thereby maintain the inertial body 34 at the deepest position in the support depression 32. Also, when an acceleration in the longitudinal direction of a vehicle as indicated by arrow FR in FIG. 1 acts on the sensor bracket 12, an inertial force induced by the acceleration and acting on the upper weight 28 prevents the sensor bracket 12 from rotating about the swing center axis 0, thereby maintaining the sensor bracket 12 at its original position shown in FIG. 1.

The upper weight 28 is intended to cancel an inertial force acting below the swing center axis 0 on an assembly of the sensor bracket 12, the output interlock member 40, and the lower weight 72. Accordingly, the deflected distance of the upper weight 28 from the swing center axis 0 and the weight of the upper weight 28 may be determined so as to cancel this inertial force. When the mass of elements other than the upper and lower weights 28 and 72 is ignorably small as compared with the mass of both the weight 28 and the lower weight 72, for example, when the upper weight 28, the lower weight 72, and the inertial body 34 are made of metal, other elements are made of a synthetic resin, with the inertial body 34 being located on the swing center axis 0, the upper weight 28 and the lower weight 72 may be designed to meet the following relation. When the upper weight 28 and the lower weight 72 are located at the distances L1 and L2, respectively, away from the swing center axis 0 and have weights W1 and W2, respectively, these parameters may be determined so as to meet the following: W1<W2 and substantially W1×L1=W2×L2.

As a result, when seatback B is tilted for reclination, the lower weight 72 functions to bring the sensor bracket 12 back to its original position. When an acceleration in the direction of arrow FR acts on the vehicle, inertial forces of the upper and lower weights 28 and 72 cancel each other to thereby maintain the sensor bracket 12 at its original position. In a case where the mass of elements other than the upper and lower weights 28 and 72 is not ignorable, individual elements may be manufactured so as to satisfy the above-described expression, where L1 is a distance from the swing center axis 0 to the center of gravity of an upper mass located above the swing center axis 0, and L2 is a distance from the swing center axis 0 to the center of gravity of a lower mass located below the swing center axis 0.

The center-of-gravity setting means may assume a variety of constructions so long as the center of gravity of an assembly of the sensor bracket 12, the output interlock member 40, and the lower weight 72 is located below the swing center axis 0 through employment of the center-of-gravity setting means. For example, the thickness of the bottom plate portion 30 of the sensor bracket 12 may be increased to increase the weight thereof. Alternatively, the swing center axis 0 may be positioned in the vicinity of the free ends of both the free-ended side portions 24 and 36.

As a result of installation of the lower weight 72 at the bottom plate portion 30 of the sensor bracket 12, even when the sensor housing 10 relatively rotates about the swing center axis 0, gravity acting on the lower weight 72 causes the sensor bracket 12 to maintain its original position shown in FIG. 1.

Figure 4:
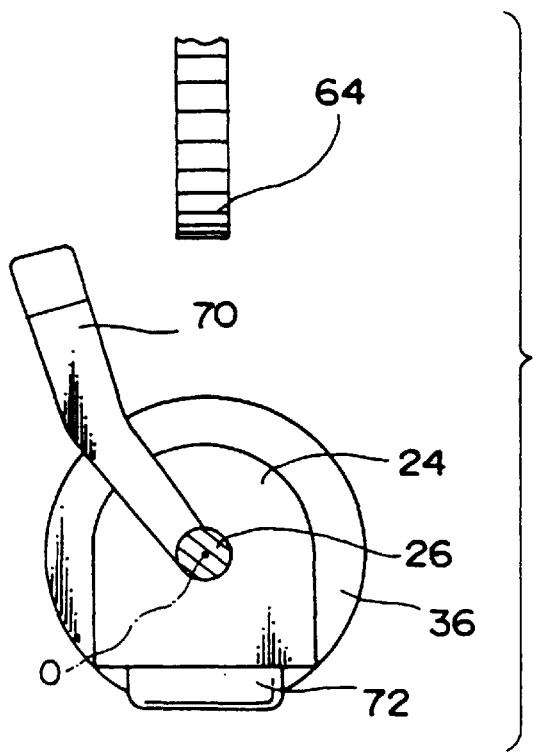
FIG. 4 is a side view that corresponds to the side view taken along line II—II of FIG. 1 and shows another example of a forcibly driving member used in the acceleration sensor apparatus according to the first embodiment.
Figure 5:
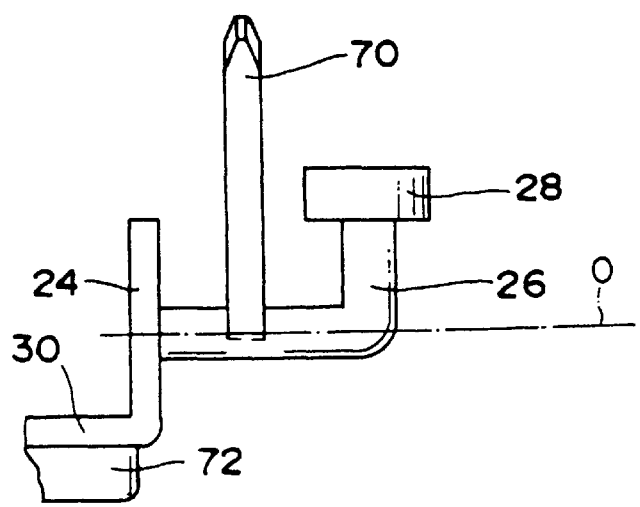
FIG. 5 is a front view showing a main portion of the forcibly driving member of FIG. 4.

In FIG. 1, the forcibly driving member 70 according to the first embodiment having the above-described structure is provided at the free-ended side portion 36 of the sensor bracket 12. However, as shown in FIGS. 4 and 5, the forcibly driving member 70 may integrally project from the shaft portion of the arm 26 which extends along the swing center axis 0. When the sensor bracket 12 rotates about the swing center axis 0 by a predetermined angle, the tip of the forcibly driving member 70 projecting from the arm 26 directly engages a tooth space of the retractor gear 64 to thereby prevent the retractor gear 64 from rotating.

Figure 6:
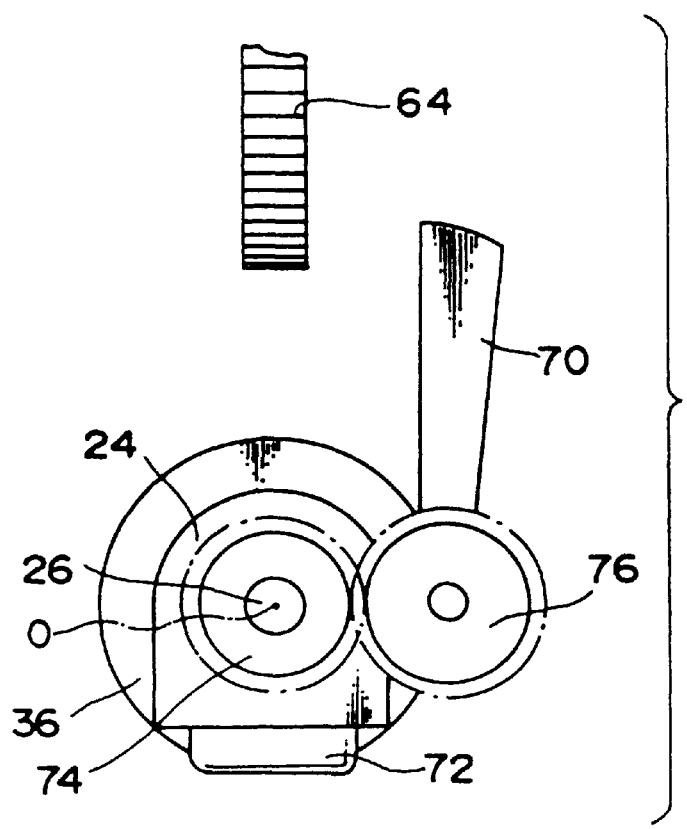
FIG. 6 is a side view that corresponds to the side view taken along line II—II of FIG. 1 and shows still another example of the forcibly driving member used in the acceleration sensor apparatus according to the first embodiment.
Figure 7:
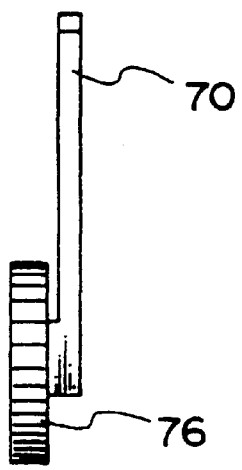
FIG. 7 is a front view showing a main portion of the forcibly driving member of FIG. 6.

Further, as shown in FIGS. 6 and 7, the forcibly driving member 70 may be integrally projected from a driven gear 76 which engages a driving gear 74 mounted on the arm 26. The tip end of the forcibly driving member 70 engages a tooth space of the retractor gear 64 to thereby prevent the retractor gear 64 from rotating. As a matter of fact, a mechanism for interlocking the sensor bracket 12 and the forcibly driving member 70 may employ a variety of structures.

Next will be described the operation of the acceleration sensor apparatus according to the first embodiment.

When the seatback B of the reclining seat S is tilted, the sensor housing 10 of the acceleration sensor apparatus of the retractor R mounted on the seatback B relatively tilts about the swing center axis 0.

In this case, as a result of the action of the lower weight 72 serving as center-of-gravity setting means, the sensor bracket 12 swingably supported about the swing center axis 0 is maintained at its original position as before seatback B is tilted. That is, the sensor bracket 12 relatively rotates about the swing center axis 0 to thereby remain at its original position.

When an acceleration perpendicular to the swing center axis 0 is imposed on the sensor bracket 12 swingably supported about the swing center axis 0, an inertial force induced by the acceleration acts on the lower weight 72.

Figure 10:
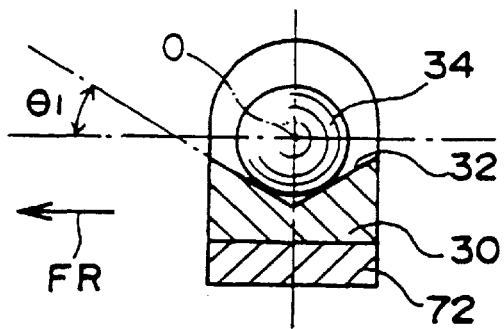
FIG. 10 is a vertical sectional view for illustrating the relation between an inertial body and a support depression of a sensor bracket of the acceleration sensor apparatus of the present invention when the sensor bracket is in its original position.

At the same time, an inertial force induced by the acceleration acts on the upper weight 28 fixed to the sensor bracket 12 via the arm 26. Thus, the inertial force acting on the upper weight 28 cancels the above-described inertial force acting on the lower weight 72. As shown in FIG. 10, this prevents the sensor bracket 12 from swinging about the swing center axis 0.

At this time, since the center of the inertial body 34 is located on the swing center axis 0, the inertial body 34 is free from any restraint from the upper weight 28. Thus, the inertial body 34 ascends along the slope of the support depression 32, causing the driven portion 42 of the output interlock member 40 to swing in the direction of arrow A. In an interlocking relation with this swing of the driven portion 42, the connection portion 44 of the output interlock member 40 presses the interlock projection 62 of the interlock stopper member 54 in the direction of arrow A to thereby rotate the interlock stopper member 54 about the shaft 20 in the direction of arrow B. As a result, the latch tooth 68 of the stopper member 66 rises in the direction of arrow C and engages a tooth space of the retractor gear 64 to thereby lock the retractor gear 64. This actuates a stopper mechanism of an unillustrated retractor apparatus and thereby restrains the webbing from further being released from a retractor.

When a reclining seat's seatback provided with the above-described acceleration sensor apparatus according to the first embodiment is tilted within a tilt angle range of 12 degrees to 27 degrees, for example, to a predetermined tilt angle of 15 degrees to 20 degrees, the forcibly driving member 70 operates to lock the retractor gear 64. This locking operation is described in detail below. When the seatback provided with the acceleration sensor apparatus is tilted to a predetermined angle, the sensor housing 10 also tilts accordingly. At this time, the center-of-gravity setting means causes the sensor bracket 12 to tilt about the swing center axis 0 to thereby maintain the sensor bracket 12 at its original position. Because of the resultant relative rotation between the sensor bracket 12 and the sensor housing 10, the interlock stopper member 54 pivotably supported on the shaft 20 of the sensor housing 10 rotates relative to the forcibly driving member 70 of the sensor bracket 12. As a result, a part of the stopper member 66 of the interlock stopper member 54 abuts against the forcibly driving member 70, which thus causes the interlock stopper member 54 to rotate about the shaft 20 in the direction of arrow B.

Consequently, the latch tooth 68 of the stopper member 66 moves in the direction of arrow C and engages a tooth space of the retractor gear 64 to thereby lock the retractor gear 64. This actuates an unillustrated retractor apparatus to restrain webbing from further being released. In the first embodiment shown in FIG. 1, two forcibly driving members 70 are provided on the sensor bracket 12 in rotation symmetry with respect to the swing center axis 0. Accordingly, even when the sensor bracket swings about the swing center axis 0 either clockwise or counterclockwise, it is possible to lock the retractor gear 64 through movement of the interlock stopper member 54.

For other embodiments of the forcibly driving members 70 shown in FIGS. 4 to 7, only when the sensor bracket 12 swings clockwise in FIGS. 4 and 6, the forcibly driving member 70 directly engages a tooth space of the retractor gear 64 to thereby restrain the retractor gear 64 from rotating.

Next will be described the relation between the inertial body 34 and the support depression 32 of the sensor bracket 12. In FIG. 10, the sensor bracket 12 is in its original position, i.e. the slope of the support depression 32 forms a predetermined angle $\theta 1$ with the horizontal plane. In this state, upon reception of an acceleration in the direction of arrow FR, the inertial body 34 ascends along the slope of the support depression 32 in the direction of arrow FR to thereby move an unillustrated output interlock member as expected.

Figure 11:
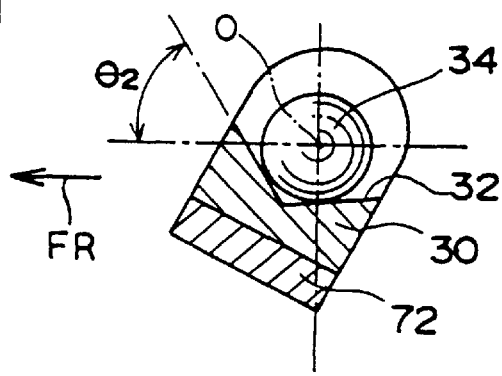
FIG. 11 is a sectional view for illustrating the relation between an inertial body and a support depression of a sensor bracket of the acceleration sensor apparatus of the present invention when the sensor bracket is tilted.

By contrast, as shown in FIG. 11, when the sensor bracket 12 swings clockwise upon reception of an acceleration in the direction of arrow FR, the angle $\theta 2$ between the slope of the support depression 32 and the horizontal plane becomes greater than $\theta 1$ as shown in FIG. 10. Accordingly, the slope angle $\theta 2$ of the support depression 32 is too large for the inertial body 34 to ascend along the slope of the support depression 32. As a result, the inertial body 34 cannot move the output interlock member 40. Thus, the acceleration sensor apparatus fails to properly detect an acceleration.

However, in the present embodiment, the upper weight 28 is provided at a position higher than the swing center axis 0 by means of the arm 26. The upper weight 28 functions to cancel an inertial force acting on the portion of the sensor bracket 12 located below the swing center axis 0 to thereby prevent the sensor bracket 12 from swinging. Accordingly, the inertial body 34 detects an acceleration in a predetermined direction, and thus the acceleration sensor apparatus operates properly.

An acceleration sensor apparatus according to a second embodiment of the present invention will next be described with reference to FIG. 9.

The second embodiment is a modification of the first embodiment wherein upper and lower weights are disposed. In FIG. 9, the same members as those of the above-described first embodiment are denoted by common reference numerals, and the detailed description thereof is omitted.

The acceleration sensor apparatus according to the second embodiment has the following structure. A sensor bracket 12 is swingably supported by a sensor housing 10. An inertial body 34 drives an output interlock member 40 pivotably supported by the sensor bracket 12. The thus-driven output interlock member 40 actuates an interlock stopper member 54, which in turn locks a retractor gear 64.

The sensor housing 10 has a box-like shape whose top is open. A support projection 82 projects from the outer surface of each of two side portions 80 and is located at a central position of the outer surface. A through-hole 84 for coupling use is formed in each support projection 82. The sensor housing 10 is mounted on a retractor frame 86. In order to receive the sensor housing 10, an open-ended rectangular opening 88 is formed in one side portion of the retractor frame 86. A through-hole 90 is formed in each projecting portion 92 located on both sides of the opening 88 in such a manner as to align with each through-hole 84 formed in the sensor housing 10. In FIG. 9, due to limited space of illustration, the retractor frame 86 is illustrated in a greater reduced scale than other elements. The support projections 82 of the sensor housing 10 are brought into contact with the corresponding projecting portions 92 such that the through-holes 84 align with the through-holes 90. Subsequently, the sensor housing 10 is fixed on the retractor frame 86 through use of unillustrated screws and nuts.

A bearing bore 96 is formed in each of the other opposed side portions 94 of the sensor housing 10. Each bearing bore 96 is formed such that it is partially open at the end surface of the side portion 94. A pair of pivotal support bases 98 stand from the top end surface of one side portion 80. Each pivotal support base 98 is formed into a small rectangular projection. A bearing bore 100 is formed in each pivotal support base 98. Each bearing bore 100 is also cut such that it partially opens at the end surface of the bearing base 98.

Figure 9:
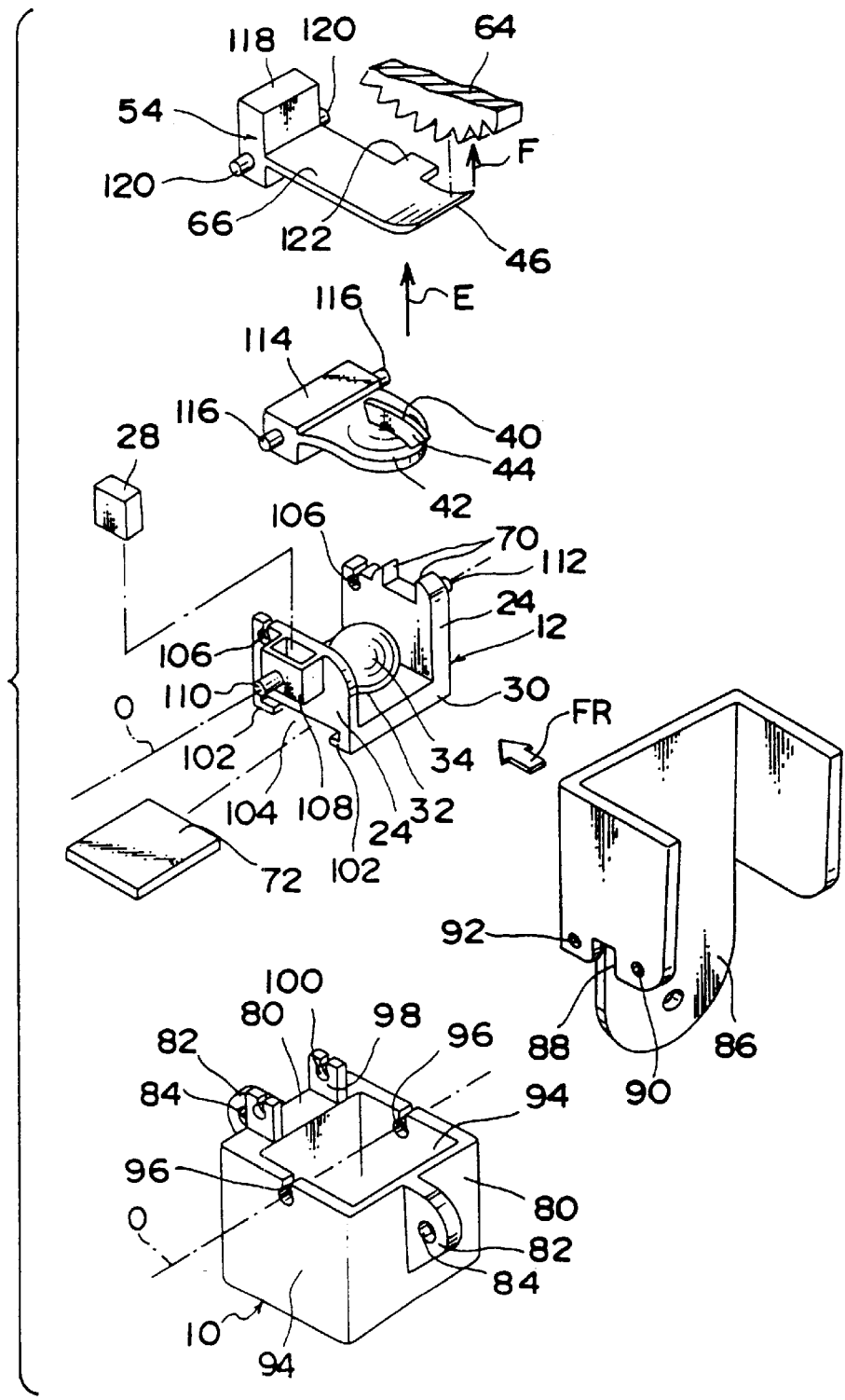
FIG. 9 is an exploded perspective view of an acceleration sensor apparatus for a vehicle according to a second embodiment of the present invention.

As shown in FIG. 9, the sensor bracket 12 swingably supported by the above-described sensor housing 10 has a U-shape as viewed from the front. That is, free-ended side portions 24 stand in parallel from both ends of a bottom plate portion 30. A support depression 32 having a V-shaped cross-section is formed in the planar surface of the bottom plate portion 30 on the side of a free end of the free-ended side portion 24. A pair of holder portions 102 integrally extend from both side edges of the bottom plate portion 30 on the side opposite to the support depression 32 in a manner facing each other. A rectangular flat lower weight 72 is inserted into a pocket 104 formed between the holder portions 102, so that the lower weight 72 and the sensor bracket 12 are attached together into the sensor housing 10.

A bearing bore 106 is formed in each free-ended side portion 24 of the sensor bracket 12. Each bearing bore 106 is cut such that it partially opens at the end surface of each free-ended side portion 24.

A pocket 108 for accommodating an upper weight 28 is integrally formed on the planar side surface of one free-ended side portion 24 on the side opposite to the bottom plate portion 30. The pocket 108 is shaped in a small box whose top is open. The upper weight 28 is inserted into the inner space of the pocket 108. A shaft 110 projects from the outer planar side surface of the pocket 108.

In the other free-ended side portion 24 of the sensor bracket 12, a shaft 112 aligned with the shaft 110 projects from a side surface on the side opposite to the bottom plate portion 30. A pair of forcibly driving members 70 projects from the free end surface of this free-ended side portion 24. Each forcibly driving member 70 is formed into a quadrant shape. The forcibly driving members 70 are arranged such that they are a predetermined distance apart from each other and such that their flat surfaces face each other. The shafts 110 and 112 are inserted into the bearing bores 96 of the sensor housing 10, so that the sensor bracket 12 is swingably supported by the sensor housing 10.

An output interlock member 40 is pivotably supported by the sensor bracket 12. The output interlock member 40 is formed by a connection portion 44 and a driven portion 42 that are integrated together. The driven portion 42 is formed into a disk-like shape. The surface of the driven portion 42 opposed to the support depression 32 is formed into a substantially spherical concave to receive the inertial body 34. A pivotal support portion 114 having a rectangular prism shape is formed at the base end section of the driven portion 42. The connection portion 44 is a small projection which integrally projects from the surface of the driven portion 42 on the side opposite to the inertial body 34. The connection portion 44 has a free-ended arc section. The thus-structured output interlock member 40 is swingably supported by the sensor bracket 12 through insertion of axial pins 116 into the bearing bores 106 of the sensor bracket 12.

As described above, the output interlock member 40 is pivotably supported by the sensor bracket 12, which in turn is pivotably supported by the sensor housing 10. An interlock stopper member 54 is pivotably supported by a pair of the pivotal support bases 98. In the interlock stopper member 54, the free end portion of a stopper member 66 shaped in a small rectangular plate is curved toward the retractor gear 64 to thereby form a latch tooth 46. A pivotal support portion 118 shaped in a rectangular block is integrally formed at the base end of the stopper member 66. Axial pins 120 project from both lateral sides of the pivotal support portion 118. An interlock portion 122, which is shaped in a small rectangle, integrally projects from one lateral side edge of the stopper member 66 at a predetermined position.

The thus-structured interlock stopper member 54 is swingably supported by the sensor housing 10 through insertion of the axial pins 120 into the bearing bores 100 of the pivotal support bases 98 of the sensor housing 10.

The thus-structured acceleration sensor apparatus is mounted onto the retractor frame 86 such that the latch tooth 46 of the stopper member 66 is located below the retractor gear 64 in a manner capable of engaging with and disengaging from the retractor gear 64.

An unillustrated retractor R having the above-described retractor frame 86 is structured such that when the retractor gear 64 is locked, a webbing W is restrained from further being released from the retractor R.

Next will be described the operation of the acceleration sensor apparatus according to the second embodiment. The following description assumes that a retractor provided with the vehicle acceleration sensor according to the second embodiment is mounted to a seatback B of a reclining seat S of a vehicle. When the seatback B is tilted for adjustment purpose, the sensor housing 10, together with the retractor frame 86, is tilted. At this time, because of the employment of the lower weight 72, the sensor bracket 12 swings relative to the sensor housing 10 about the shafts 110 aligned with the swing center axis 0 so as to maintain its original position. Accordingly, the slope of the support depression 32 maintains a predetermined angle with the horizontal plane.

When an acceleration in the direction of arrow ER acts on the acceleration sensor apparatus according to the second embodiment, an inertial force acting on the upper weight 28 and located above the swing center axis 0 cancels a moment of inertia induced in an assembly of the sensor bracket 12, the lower weight 72, and the output interlock member 40, the center of gravity of which assembly being located below the shafts 110 and 112 aligned with the swing center axis 0. Thus, the sensor bracket 12 is maintained at its original position.

As a result, only the inertial body 34 moves in a direction opposite to the arrow FR and ascends along the slope of the support depression 32 in a rolling manner. The ascending inertial body 34 lifts the output interlock member 40, and consequently the output interlock member 40 swings in the direction of arrow E. Thus, the connection portion 44 of the output interlock member 40 pushes up the stopper member 66 of the interlock stopper member 54 in the direction of arrow F. This causes the latch tooth 46 of the stopper member 66 to engage a tooth space of the retractor gear 64 to thereby lock the retractor gear 64.

When the retractor gear 64 is locked, an unillustrated retractor functions to restrain the webbing from further being released.

In the acceleration sensor apparatus according to the second embodiment, when the sensor housing 10, together with the retractor frame 86, is tilted within a tilt angle range of 12 degrees to 27 degrees, for example, to a predetermined tilt angle of 15 degrees to 20 degrees, the sensor bracket 12 swings relative to the sensor housing 10. As a result, one of the forcibly driving members 70 of the sensor bracket 12 abuts against the interlock portion 122 of the stopper member 66 to thereby lifts the stopper member 66 in the direction of arrow F. This causes the latch tooth 46 of the stopper member 66 to engage a tooth space of the retractor gear 64 to thereby lock the retractor gear 64. Since the forcibly driving members 70 are arranged in rotation symmetry with respect to the swing center axis 0, even when the sensor bracket 12 relatively swings either clockwise or counterclockwise, one of the forcibly driving members 70 actuates the stopper member 66. Thus, it is possible to reliably restrain the webbing from further being released from a retractor apparatus.

The structure of an acceleration sensor apparatus of the present invention is not limited to the structures of the above-described embodiments. For example, the structure of the acceleration sensor apparatus of the present invention can be applied to an acceleration sensor apparatus in which an inertial body is designed to swing like a pendulum, and the pendulous inertial body actuates an output interlock member so as to detect an acceleration. Moreover, the structure of the acceleration sensor apparatus of the present invention can be applied to other kinds of acceleration sensor apparatuses such as an acceleration sensor in which an inertial body is substantially cylindrical and arranged vertically, and when the inertial body is tilted to a predetermined angle, an output interlock member provided at the top portion of the inertial body rises.

Effect of the Invention

An acceleration sensor apparatus for a vehicle according to the present invention can properly detect an acceleration acting on a vehicle body in a predetermined direction even when the mounted orientation of the acceleration sensor apparatus changes relative to the vehicle body, and can provide an output operation when the vehicle body tilts more than a predetermined angle.

What is claimed is:

1. An acceleration sensor apparatus wherein an inertial body is inertially moved according to a vehicle acceleration, comprising:

an inertial body;

a sensor bracket which supports said inertial body so that the inertial body is movable within a predetermined range within said bracket, said sensor bracket being swingably supported in a vehicle;

a lower weight which is mounted on said sensor bracket below said inertial body, said lower weight having a center of gravity located below a swing center of said sensor bracket, and being structured to maintain said sensor bracket in a same position relative to a vertical axis regardless of a tilt of the vehicle; and an upper weight which is lighter than said lower weight and is mounted on said sensor bracket above said inertial body, said upper weight having a center of gravity located above the swing center of said sensor bracket and structured to cancel a swing of said sensor bracket induced by an acceleration acting on said sensor bracket and lower weight to thereby keep said bracket at a standstill.

2. An acceleration sensor apparatus for a vehicle according to claim 1, wherein said sensor bracket is formed with an accommodation section for accommodating at least said upper or lower weight.

3. An acceleration sensor apparatus for a vehicle according to claim 2, further comprising an output member to be driven through inertial movement of said inertial body, and a forcibly driving member for driving said output member when a tilt of a vehicle reaches a predetermined value.

4. An acceleration sensor apparatus for a vehicle according to claim 3, wherein said forcibly driving member is a projection integrally projected from said sensor bracket.

5. An acceleration sensor apparatus for a vehicle according to claim 1, further comprising an output member to be driven through inertial movement of said inertial body, and a forcibly driving member for driving said output member when a tilt of a vehicle reaches a predetermined value.

6. An acceleration sensor apparatus for a vehicle comprising:

a sensor housing fixed on a seatback of a reclining seat of a vehicle;

a sensor bracket supported swingably relative to said sensor housing about an axis which is substantially parallel to an axis of tilting the seatback;

an inertial body having a spherical shape and supported so as to be movable within a predetermined range in a support depression formed in said sensor bracket;

an output member for locking a seat belt retractor gear in an interlocking relation with said inertial body's ascending movement along a slope of the support depression upon reception of an acceleration acting on said vehicle;

an upper weight located above a swing center axis of said sensor bracket and adapted to cancel a swing of said sensor bracket induced by an acceleration acting on said sensor bracket to thereby bring said sensor bracket to a standstill; and a lower weight supported swingably about the swing center axis of said sensor bracket for bringing a center of gravity of said bracket to a position lower than the swing center axis.

7. An acceleration sensor apparatus for a vehicle according to claim 6, wherein said sensor bracket comprises a bottom plate portion in which the support depression is formed in a planar surface thereof, free-ended portions standing in parallel with each other at both ends of said bottom plate portion, said bottom plate portion and said free-ended portions generally forming a U-like side shape, and an arm projecting from an outer surface of said one free-ended portion.

8. An acceleration sensor apparatus for a vehicle according to claim 7, wherein said upper weight is provided at a tip end of said arm, and said lower weight is provided on a lower side of said bottom plate portion.

9. An acceleration sensor apparatus for a vehicle according to claim 6, wherein said output member comprises:

a driven portion operatively engaged to said inertial body and which moves in response to a movement of said inertial body;

a connection portion located opposite to said driven portion with respect to a pivotably supported base section of said driven portion;

an interlock stopper member operatively engaged to a spherical interlock head integrally formed at a free end section of said connection portion; and an engagement piece provided at a tip end portion of said stopper member and adapted to engage the seat belt retractor gear.

10. An acceleration sensor apparatus for a vehicle according to claim 6, wherein said sensor bracket is formed such that a circular plate section having a spherical concave at a center is integrally formed at one end of a rectangular plate, said inertial body being held between the concave and the support depression of said sensor bracket.

11. An acceleration sensor apparatus for a vehicle according to claim 6, further comprising at least one forcibly driving member operatively engaged to said output member for driving said output member when a tilt of a vehicle reaches a predetermined value.

12. An acceleration sensor apparatus for a vehicle according to claim 11, wherein said forcibly driving member is a projection integrally projecting from said sensor bracket.

13. An acceleration sensor apparatus for a vehicle according to claim 6, wherein the support depression of said sensor bracket has a V-shaped vertical section.

14. An acceleration sensor apparatus for a vehicle, wherein an inertial body is inertially moved according to a vehicle acceleration, comprising:

an inertial body;

a sensor bracket which supports said inertial body so that the inertial body is movable within a predetermined range within said bracket, said sensor bracket being swingably supported in a vehicle;

a lower weight which is mounted on said sensor bracket, said lower weight having a center of gravity located below a swing center of said sensor bracket and below said inertial body, and being structured to maintain said sensor bracket at a same position relative to a vertical axis regardless of a tilt of the vehicle;

an upper weight which is lighter than said lower weight and is mounted on said sensor bracket above said inertial body, said upper weight having a center of gravity located above the swing center of said sensor bracket and structured to cancel a swing of said sensor bracket induced by an acceleration acting on said sensor bracket and lower weight to thereby bring said bracket to a standstill;

an output member to be driven through inertial movement of said inertial body, and a forcibly driving member engaged to said output member for driving said output member when a tilt of the vehicle reaches a predetermined value.

15. An acceleration sensor apparatus for a vehicle according to claim 14, wherein a sensor housing to which said sensor bracket is swingably attached is supported by a seatback of a reclining seat of a vehicle, and when the seatback is tilted, said lower weight causes said forcibly driving member to relatively rotate to thereby abut against said output member.

16. An acceleration sensor apparatus for a vehicle according to claim 14, wherein said sensor bracket comprises a bottom plate portion in which a support depression for supporting said inertial body is formed in a planar surface thereof, free-ended portions standing in parallel with each other at both ends of said bottom plate portion, said bottom plate portion and said free-ended portions generally forming a U-like side shape, and an arm projects from an outer surface of said one free-ended portion.

17. An acceleration sensor apparatus for a vehicle according to claim 14, wherein said upper weight is provided at a tip end of an arm, and said lower weight is provided on a lower side of said sensor bracket.

18. An acceleration sensor apparatus for a vehicle according to claim 14, wherein said forcibly driving member is a projection integrally projecting from said sensor bracket.

* * * * *